US012782973B2

(12) United States Patent
Werschler et al.

(10) Patent No.: US 12,782,973 B2
(45) Date of Patent: Nov. 3, 2026

(54) METHOD FOR OPERATING A DRIVERLESS TRANSPORT SYSTEM, SUPPLY DEVICE AND TRANSPORT SYSTEM

(71) Applicant: IMS GEAR SE & CO. KGAA, Donaueschingen (DE)

(72) Inventors: Marco Werschler, Raolfzell am Bodensee (DE); Steve Hwang, Carlsbad, CA (US)

(73) Assignee: IMS GEAR SE & CO. KGAA, Donaueschingen (DE)

( * ) Notice: Subject to any disclaimer, the term of this patent is extended or adjusted under 35 U.S.C. 154(b) by 55 days.

(21) Appl. No.: 18/717,191

(22) PCT Filed: Dec. 8, 2022

(86) PCT No.: PCT/EP2022/084926
§ 371 (c)(1),
(2) Date: Jun. 6, 2024

(87) PCT Pub. No.: WO2023/104947
PCT Pub. Date: Jun. 15, 2023

(65) Prior Publication Data

US 2025/0036146 A1 Jan. 30, 2025

(30) Foreign Application Priority Data

Dec. 8, 2021 (EP) .................................... 21213246

(51) Int. Cl.
*G05D 1/69* (2024.01)
*G05D 1/646* (2024.01)
(Continued)

(52) U.S. Cl.
CPC ............... *G05D 1/69* (2024.01); *G05D 1/646* (2024.01); *G05D 1/667* (2024.01);
(Continued)

(58) Field of Classification Search
None
See application file for complete search history.

(56) References Cited

U.S. PATENT DOCUMENTS

| | | |
|---|---|---|
| 5,367,456 A | 11/1994 | Summerville et al. |
| 5,615,992 A | 4/1997 | Proske et al. |

(Continued)

FOREIGN PATENT DOCUMENTS

| | | |
|---|---|---|
| EP | 2881828 A1 | 6/2015 |
| EP | 3699020 A1 | 8/2020 |

(Continued)

OTHER PUBLICATIONS

Gunter Ulrich et al., "Fahrerlose Transportsysteme: Eine Fibel—mit Praxisanwendungen—zur Technik—fur die Planung", Jan. 19, 2011; retrieved from the Internet: no url [retrieved Nov. 19, 2018]; cited in PCT Search Report.

(Continued)

*Primary Examiner* — Christopher A Buksa
(74) *Attorney, Agent, or Firm* — Nath, Goldberg & Meyer; Jerald L. Meyer; Morgan D. Rosenberg

(57) ABSTRACT

The present invention relates to a method for operating a driverless transport system (1) with a plurality of battery-operated and driverless vehicles (3) for transporting a consignment of goods (6) over a drivable logistics region (10) having a supply device (2), the supply device (2) having at least one receptacle (20) which receives at least one vehicle (3) and is movable in at least one vertically oriented plane in a storage region (12), comprising the following method steps:

Figure 1:
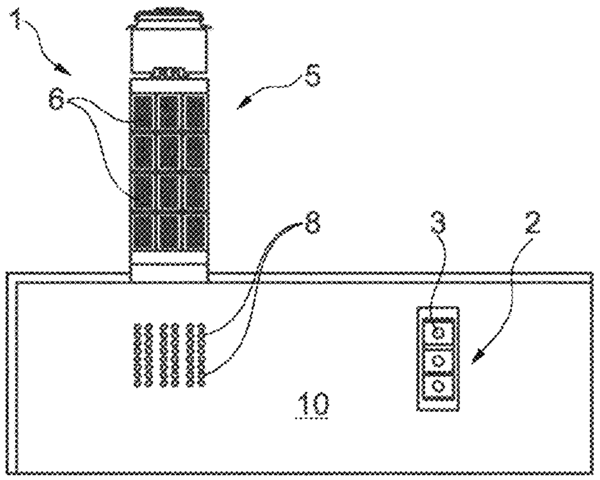

Supplying at least one vehicle (3) by means of the receptacle (20) in the logistics region (10);

Positioning the at least one vehicle (3) at the consignment of goods (6);

(Continued)

Coupling the consignment of goods (6) to the at least one vehicle (3) and transporting the consignment of goods by the at least one vehicle (3) from a first location to a second location;

Depositing the consignment of goods (6);

Receiving the at least one vehicle (3) by the receptacle (20) of the supply device (2); and Moving the at least one receptacle (20) with the at least one vehicle (3).

21 Claims, 3 Drawing Sheets

(51) Int. Cl.

| | |
|---|---|
| ***G05D 1/667*** | (2024.01) |
| ***G05D 105/20*** | (2024.01) |
| ***G05D 107/70*** | (2024.01) |
| ***G05D 109/10*** | (2024.01) |

(52) U.S. Cl.

CPC ..... *G05D 2105/20* (2024.01); *G05D 2107/70* (2024.01); *G05D 2109/10* (2024.01)

(56) References Cited

U.S. PATENT DOCUMENTS

| | | | |
|---|---|---|---|
| 2012/0259482 | A1 | 10/2012 | Jeschke |
| 2014/0088758 | A1 | 3/2014 | Lert et al. |
| 2015/0203296 | A1 | 7/2015 | Buzan et al. |
| 2019/0236741 | A1 * | 8/2019 | Bowman ................ G05D 1/692 |
| 2020/0091744 | A1 | 3/2020 | Vain et al. |
| 2020/0406781 | A1 | 12/2020 | Kamikawa et al. |

FOREIGN PATENT DOCUMENTS

| | | | |
|---|---|---|---|
| GB | 2542265 | A | 3/2017 |
| WO | 99/43581 | A1 | 9/1999 |

OTHER PUBLICATIONS

European Search Report issued Jul. 18, 2022 for priority application EP No. 21213246.8.

* cited by examiner

METHOD FOR OPERATING A DRIVERLESS TRANSPORT SYSTEM, SUPPLY DEVICE AND TRANSPORT SYSTEM

This is a National Phase Application filed under 35 U.S.C. § 371 as a national stage of PCT Application No. PCT/EP2022/084926, filed on Dec. 8, 2022, an application claiming the benefit of European Patent Application No. 21213246.8, filed on Dec. 8, 2021.

The present invention relates to a method for operating a driverless transport system with a plurality of autonomously driving and battery-operated vehicles with the features of patent claim 1 as well as a supply device and a transport system.

Driverless transport systems are already known in various configurations from the state of the art. Driverless transport systems of this type are widely used in industrial, processes and in logistics for the transportation of consignments of goods. For this purpose, so-called autonomously driving and battery-powered vehicles are used, which are also referred to in the prior art as "Automated Guide Vehicles", or "AGV" for short. In a driverless transport system of this type, a number of driverless and battery-operated vehicles can be operated in a swarm and carry out extensive and time-consuming tasks automatically.

Driverless transport systems of this type are particularly widespread in warehousing and logistics, where various consignments of goods, such as palletized goods, semi-finished products, workpieces or other goods are transported from a first location to a second location. By way of example, trucks can be automatically loaded and unloaded with picked goods.

Such a driverless transport system is described, for example, in EP 3 816 752 A1, wherein the transport system comprises a plurality of autonomously driving and battery-operated vehicles. The vehicles travel over a drivable logistics region to perform tasks and can be positioned there, at a first location, under a consignment of goods such as pallets, crates or boxes, for transporting a consignment of goods. Using a lifting device of the respective vehicle, the consignment of goods can be lifted and transported to a second location. At the second location, the lifting device of the respective vehicle can lower or deposit the consignment of goods and the autonomously driving and battery-powered vehicle can fulfill the next task.

As soon as the state of charge of the battery of the vehicle declines, the autonomously driving and battery-powered vehicle travels to a charging or service station via the drivable logistics region and remains there until the battery is either sufficiently charged or has been replaced by a charged battery. Further tasks can then be carried out.

Driverless transport systems of this type have proven their worth in the past. In logistics in particular, a large number of vehicles are required to perform numerous tasks within a short space of time, for example, to assemble consignments of goods or to load a truck. The challenge here is to always have enough charged battery-powered vehicles available and, likewise, to supply the vehicles quickly when required and due to the high space costs, to move them to storage quickly and in a space-saving manner once the mission has been completed.

This is where the present invention comes in.

The present invention is dedicated to the task of proposing a suitably improved method for operating a driverless transportation system which eliminates the known prior art disadvantages. The present invention is moreover intended to propose an improved driverless transportation system with a plurality of autonomously driving and battery-operated vehicles.

These tasks are solved by the method with the features of patent claim 1, the supply device and the transportation device.

Advantageous further developments and embodiments of the present invention are given in the sub-claims.

The method according to the invention with the features of patent claim 1 for operating a driverless transport system with a plurality of battery-operated and driverless vehicles for transporting a consignment of goods over a drivable logistics region solves the task in that the transport system comprises a supply device. The supply device further comprises at least one receptacle that receives at least one vehicle, which receptacle is movable in at least one vertically oriented plane in a storage region. The method for operating a driverless transport system comprises the following method steps:

- Supplying at least one vehicle by means of the least one receptacle in the logistics area;
- Positioning the at least one vehicle at the consignment of goods that are to be transported;
- Coupling the consignment of goods to the at least one vehicle and transporting the consignment of goods by the at least one vehicle from a first location to a second location;
- Depositing the consignment of goods;
- Receiving the at least one vehicle by the receptacle of the supply device; and
- Moving the at least one receptacle with the at least one vehicle.

The present invention is based on the idea of storing the autonomously driving and battery-operated vehicle with movable receptacles in the manner of a vertical storage system. This improves the utilization of the limited available space. Preferably, the supply device comprises a large number of receptacles. These can successively supply or alternatively dispense the number of battery-operated and driverless vehicles for transporting a consignment of goods required for a task, either individually or in groups. The vehicles can swarm out from the supply device to complete the tasks on the drivable logistics region. The at least one receptacle can detect whether at least one vehicle has been received. The supply device therefore knows the status (by way: of example, whether empty, partially occupied or occupied) of the respective receptacle. The receptacle can moreover also detect the status or charge status of the at least one vehicle, which is why the supply device knows both the status of the respective receptacle and the charge status of the respective vehicle.

When supplying, a demand-oriented selection of at least one vehicle from the pool of the plurality of vehicles of the of the supply device can be made to perform one or more tasks. The selection can be made, for example, on the basis of at least one decision criterion, such as, for example, charge status, configurations and/or properties of the at least one vehicle.

It should be noted at this point that the plurality of vehicles also includes vehicles with different configurations (for example, towing vehicle or lifting vehicle) or characteristics (for example, size, performance, etc.).

According to the present invention, the drivable logistics region can be a substantially horizontally oriented area or plane comprising a floor of a building, in particular a warehouse, a plurality of floors connected by drivable ramps, a truck loading station and/or one or more truck loading areas that can be driven upon leaving from the truck loading station. Ideally, the drivable logistics region can be a horizontally oriented logistics plane.

In the simplest case, the at least one receptacle can comprise at least one parking position that can be accessed by at least one vehicle. To supply the at least one vehicle, the at least one receptacle is positioned in the logistics region and the at least one vehicle can drive from the parking position and swarm out into the logistics region. To receive the at least one vehicle by the supply device, the at least one vehicle can drive back to the supply device and drive into the at least one parking position of the receptacle.

According to a further development of the method according to the invention, it is further provided that a battery of the at least one vehicle can be changed or charged in the storage region. The electrical charging of the battery of the at least one vehicle can be carried out by corresponding means, wherein the charging process is preferably started as soon as the at least one vehicle has been received by the receptacle of the supply device.

The electrical charging of the battery of the at least one vehicle can be carried out conductively, which is to say, by means of physical electrical contacts, or inductively, wherein conductive charging is preferred due to its better efficiency.

According to a further development of the method, the at least one vehicle travels by means of the supply device to the receptacle when the task, which is to say, the transportation of the consignment of goods, is completed, or when the charge level of the battery-operated vehicle falls below a certain level. The control system of the vehicle or the system can also use artificial intelligence to determine when the battery needs to be recharged and guide the at least one vehicle to the supply device.

The at least one vehicle travels back to the supply device and waits there until a receptacle can receive the at least one vehicle.

It can be advantageous if the at least one receptacle is movable along a guide device. The at least one receptacle is preferably forcibly actuated by the guide device.

According to a preferred further development, a plurality of receptacles is supplied, which receptacles are movable along the guide device. Preferably, the receptacles can be evenly distributed and preferably arranged coupled to one another. By way of example, the guide device can be configured as a cable hoist, chain hoist, chain magazine or a paternoster elevator and can comprise a rail guide and/or traction mechanism guide. Alternatively, the guide device can be configured as a drum magazine or a movable high rack, for example.

According to a preferred further development of the method according to the invention, the at least one receptacle is guided by the guide device along a closed travel path. The closed travel path preferably intersects the at least one logistics region at least once in an area referred to here as the intersection point, wherein the closed travel path further preferably intersects the at least one logistics region at least twice. At the least one intersection point of the closed travel path with the at least one logistics region, the supply or dispensing or alternatively receiving of the at least one vehicle can take place. The supply or alternatively dispensing takes place through a so-called exit area and the receiving through a so-called entry area.

If, for example, there are at least two intersections, a first intersection can be used as the entry area and the second intersection as the exit area. The entry and exit areas can, however, also be combined into one, wherein the directions of travel of the at least one vehicle should preferably be the same in the entry and exit areas.

In the entry and/or exit area, the vehicles can preferably be received in a plurality of travel directions. By way of example, the direction of travel can be parallel to the normal vector of the vertically oriented plane or parallel to the vertically oriented plane.

According to a preferred further development, the at least one vehicle is moved by the guiding device in one, preferably single, direction of movement of the closed circular travel path. The at least one vehicle therefore remains in the supply device at least until the receptacle has traveled a distance between the entry area and the exit area. It may therefore be advisable to calculate the number of receptacles and/or the length of the travel path in such a way that the battery of the battery-operated vehicle can be sufficiently charged. The at least one vehicle can, however, also travel the travel path several times in succession. The direction of movement can also be changed if this makes it possible for a quicker receiving and/or supply of the at least one vehicle.

A preferred further development of the method provides that the guide device specifies the position of the receptacle. Preferably, a horizontal orientation of the at least one receptacle is specified by the guide device, which guide device is preferably configured as a paternoster. Such a configuration of the guiding device ensures that the at least one vehicle remains essentially in a horizontal orientation, for example, in the parking position in the supply device, and cannot roll or slide away unintentionally.

It has moreover proven to be advantageous if, in order to supply the at least one vehicle by the supply device in the at least one drivable logistics region, the at least one receptacle is temporarily slowed down or stopped in the direction of movement along the guide device or the at least one receptacle is controlled in the direction of movement along the guide device in a targeted manner by slowing down or stopping. The temporary slowing down or stopping of the at least one receptacle makes it particularly easy to supply or receive the at least one vehicle. By way of example, the at least one vehicle to be received can travel into or onto the stopped receptacle and/or travel from or out of the receptacle to be supplied, without there being a relative movement between the receptacle and the at least one logistics region. A plurality of receptacles can be moved in succession to supply a plurality of vehicles in the at least one drivable logistics region, whereby the plurality of vehicles can be dispensed in a tightly timed manner and vice versa. By coupling the receptacles, all receptacles can be slowed down or stopped temporarily and simultaneously. In the case of a plurality of entrances and/or exits, a plurality of vehicles can be supplied and/or received simultaneously by different receptacles.

A further development of the method provides that the at least one vehicle is held or locked on the receptacle by retaining means. Preferably, retaining means can be mechanical and/or magnetic retaining means that fasten the at least one vehicle to the receptacle. The retaining means for the at least one vehicle can also comprise an electrical contact for charging the battery of the vehicle. The fastening of the at least one vehicle to the receptacle and/or the electrical contact can preferably be made via an interface, wherein the interface is preferably arranged on an underside of the vehicle. Both the locking of the at least one vehicle and electrical contact for the charging process can thus be accomplished in a simple manner.

According to an advantageous further development of the method, it can be provided that the at least one vehicle for coupling the consignment of goods can be positioned under the consignment of goods to be transported.

It may moreover be advantageous that the consignment of goods is lifted by at least one vehicle in order to couple the consignment of goods to at least one vehicle. The consignment of goods can, for example, comprise a euro-pallet and the at least one vehicle can drive into an elongated free space between two bottom boards of the euro-pallet. Load handling devices of the vehicle can lift the consignment of goods.

A preferred further development provides that a plurality of vehicles for transporting at least one consignment of goods are arranged in a demand-oriented formation on the consignment of goods or under the consignment of goods. By way of example, four or six vehicles can be arranged in a cuboid formation for transporting a euro-pallet. In each of the two elongated free spaces between the three parallel bottom boards, for example, two or three vehicles, preferably each with a lifting device, can be positioned centrally to one of the three transverse boards, wherein preferably the lifting of the consignment of goods by the formation of the vehicles takes place in a substantially synchronous manner and further preferably the movement of the consignment of goods from the first location to the second location takes place while maintaining the formation. The formation can also include a plurality of vehicles and consignments of goods. By way of example, through the use of such a formation, a truck can be loaded within a very short time by a common formation in a common movement, wherein the truck is preferably loaded or unloaded in one movement of the formation. As soon as a truck docks at the loading station, the vehicles can be dispensed from the supply device, swarm out and take up the formation for unloading the consignment of goods and also preferably carry off the consignment of goods in formation from the loading area and distribute the respective consignment of goods within the logistics region. After depositing the consignment of goods, the vehicles can swarm back to the supply device or take on other tasks, such as loading the truck in a manner similar to the unloading. This allows loading and unloading to be carried out particularly efficiently. The formation can also display an irregular appearance, for example, to handle an uneven load from the consignment of goods.

It has, moreover, proven to be advantageous if the storage region comprises at least one parking position on which at least one vehicle can be arranged. According to a preferred further development, the parking position is arranged at a vertical distance from the logistics region, wherein even more preferably the at least one vehicle can be transferred from the receptacle to the parking position. According to a preferred manner, the parking position can comprise the means for charging the battery. The at least one parking position can moreover also enable a targeted ejection of certain vehicles, for example, to carry out maintenance and/or repair work. Replacement vehicles can also be supplied in the at least one parking position in order to be able to supply sufficient vehicles in the event of vehicle failures or increased demand.

A further aspect of the present invention relates to a supply device, in particular a supply device for carrying out the method described above, for a plurality of battery-operated and driverless vehicles which can be dispensed and received in at least one drivable logistics region through an entry and/or exit area. According to the invention, the supply device has at least one receptacle that receives at least one vehicle, wherein the at least one receptacle is movable in at least one vertically oriented plane in a storage region, and wherein the at least one receptacle can dispense the at least one vehicle in the entry and/or exit area in the at least one drivable logistics region and can receive the at least one vehicle from the at least one drivable logistics region.

It has, moreover, proven to be advantageous if the at least one receptacle comprises means for changing or charging the battery of the at least one vehicle. The charging of the battery of the at least one vehicle can take place through use of the corresponding means. The charging process can moreover be started immediately upon the at least one vehicle being received by the receptacle of the supply device. The battery of the at least one vehicle can be charged electrically by conductive or inductive means, wherein conductive charging of the battery is preferred due to better efficiency.

A further development moreover provides that a guide device is supplied and that the guide device guides the at least one receptacle along a predetermined travel path in the storage region. The guiding device can represent a closed travel path. The guiding device can preferably guide a plurality of receptacles along the predetermined travel path in the manner of an endless chain, preferably evenly distributed. The guide device can therefore be configured as a cable hoist, chain hoist, chain magazine or paternoster elevator and can comprise a rail guide and/or traction mechanism. The receptacles can be coupled together and moved synchronously along the track.

The guide device can be configured as a modular construction system, which is why a supply device can be configured according to the modular system and can also be extended at a later date.

It has, moreover, proven to be advantageous if the at least one receptacle is kept horizontally oriented along the travel path. The orientation of the receptacle can either be imposed by the guiding device, or the receptacles can align themselves independently, for example, through a configuration in the manner of a gondola. In an exemplary embodiment of the guide device, the guide device can be configured as a paternoster elevator and the orientation of the at least one receptacle can be forcibly imposed.

A preferred further development of the present invention provides that the at least one receptacle comprises retaining means by which the at least one vehicle can be fastened to the receptacle. Preferably, the retaining means can be a mechanical and/or magnetic retaining means which can fasten the at least one vehicle to the receptacle. The retaining means for the at least one vehicle can also comprise an electrical contact for charging the battery of the vehicle. The attachment of the at least one vehicle to the at least one receptacle and/or the electrical contacting can or can preferably take place via an interface on the at least one vehicle, the interface preferably being arranged on an underside of the at least one vehicle.

It has, moreover, proven to be advantageous if a receptacle can accommodate at least two vehicles. Preferably, the at least two vehicles can be accommodated in a formation, whereby the formation is preferably a row formation or a cuboid formation. On the one hand, the capacity of the supply device can be increased by this further development and, on the other hand, the at least two vehicles can be supplied or received at the same time.

A further development of the supply device provides that the storage region has at least one, preferably a plurality of parking positions, and that at least one vehicle can be arranged in the respective parking position. The at least one receptacle can moreover comprise at least one parking position, whereby a vehicle accommodated by the supply device can remain at the respective receptacle for storage for the dwell time in the supply device.

According to a further development of the supply device, the at least one vehicle can drive up to or down from the at least one receptacle in the entry and/or exit area. For this purpose, the at least one receptacle is preferably brought into approximate alignment with the at least one logistics region.

According to a further embodiment of the present invention, shelf-like parking positions can be supplied in the storage region. The shelf-like parking positions can preferably be arranged at a vertical distance from the logistics region. The at least one vehicle can travel from the at least one receptacle to one of the shelf-like parking positions. The capacity of the supply device can be increased by this provision.

A further aspect of the present invention relates to a transportation system with a previously described supply device and a plurality of driverless and battery-operated vehicles.

Figure 2:
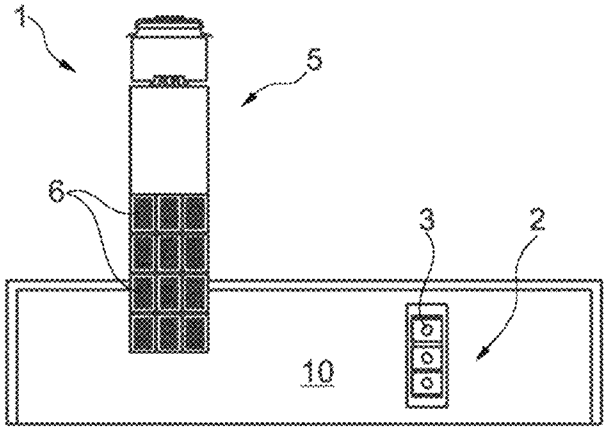
Figure 3:
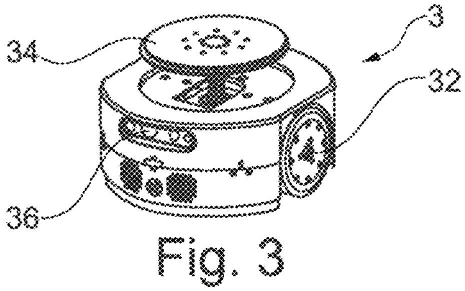
Figure 4:
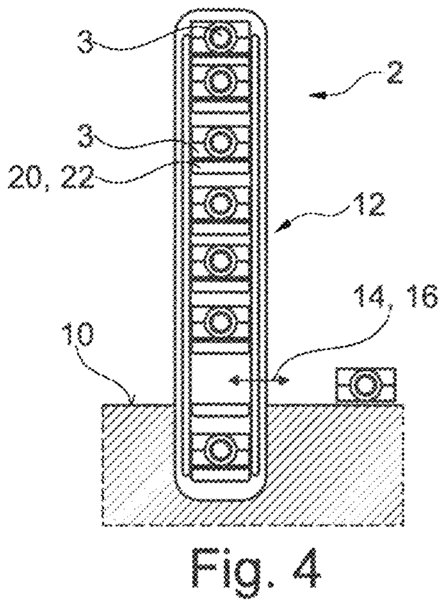
Figure 5:
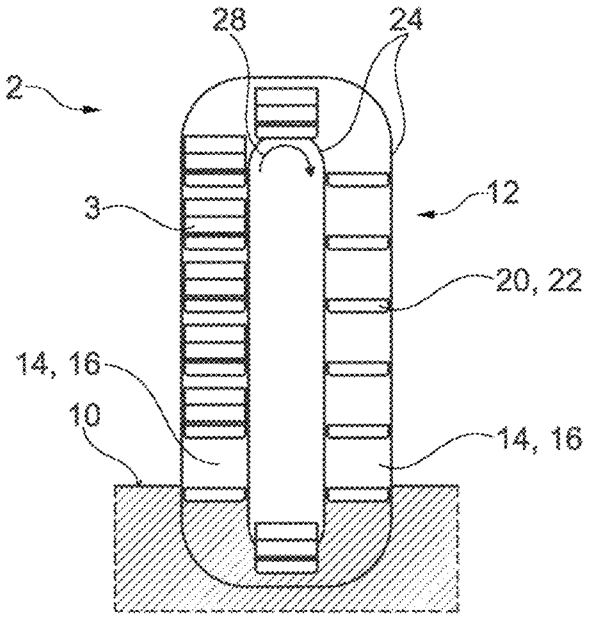
Figure 6:
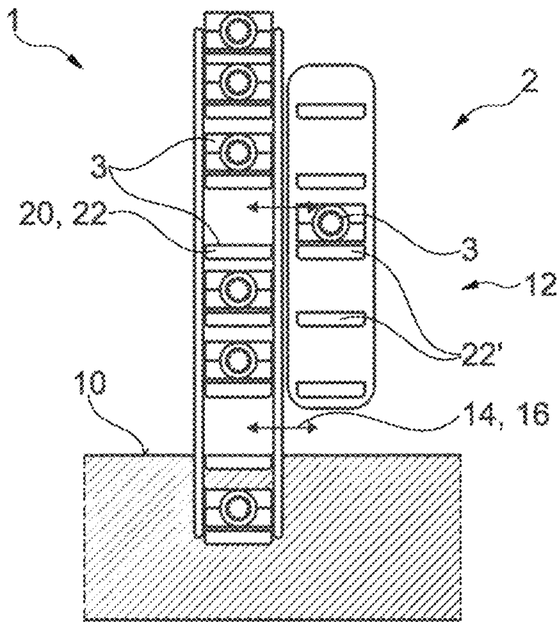
Figure 7:
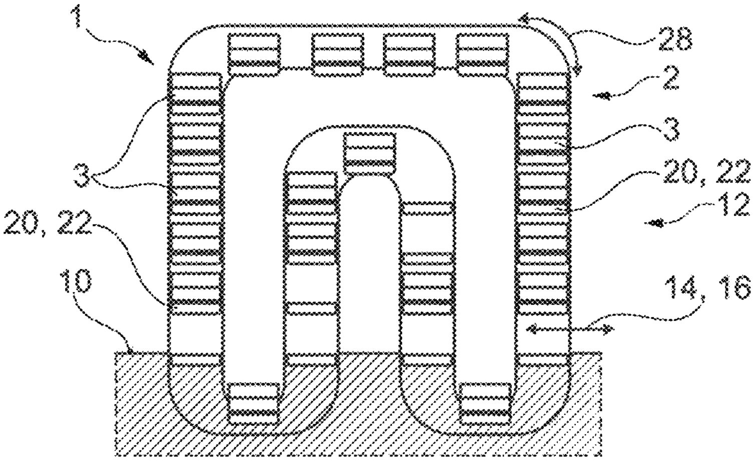

In the following, an embodiment example of the present is described in detail with reference to the accompanying drawing. Wherein:

FIG. 1 shows a schematic representation of a transportation system with a plurality of driverless and battery-powered vehicles and a supply device, wherein the vehicles are movable in a drivable logistics region, and a supply device for storing and supplying the vehicle, FIG. 2 shows a schematic representation of the transportation system according to FIG. 1, wherein a formation of vehicles loads or unloads a truck at a loading station, FIG. 3 shows a simplified perspective representation of a vehicle of the transport system, FIG. 4 shows a schematic and highly simplified side view of the supply device, FIG. 5 shows a further side view of the supply device according to FIG. 4, FIG. 6 shows a first further development of the supply device according to FIG. 4 and FIG. 5, and FIG. 7 shows a second further development of the supply device In the following, identical or functionally identical components are identified with the same reference signs. For the sake of clarity, not all identical or functionally identical parts are given a reference number in the individual figures.

FIG. 1 shows a top view on a highly simplified and schematized transport system 1, which can, for example, be used in the logistics sector. The transport system 1 comprises a supply device 2 for a plurality of battery-operated and driverless vehicles 3, which vehicles are shown in detail and by way of example in FIG. 3, which vehicles can drive autonomously over a drivable logistics region 10 for transporting a consignment of goods 6.

The consignment of goods 6 is shown in the accompanying FIG. 1 and FIG. 2 as a euro-pallet, wherein the consignment of goods to be transported can be selected at will. By way of example, the consignment of goods 6 can also be any transport container as well as other objects, such as a shopping cart, a baby carriage, a hospital bed, a dustbin or the like. The consignment of goods 6 does not necessarily need to be lifted by the vehicle 3 for transportation, but rather can also be used as an adapter or coupling to couple the vehicle 3 for transportation to the vehicle 3 and to move the consignment of goods from a first location to a second location with the at least one vehicle 3.

The vehicles 3 are autonomously driving and battery-powered vehicles, which are also referred to as "Automated Guide Vehicles", or "AGVs" for short. In particular, the vehicles 3 can be so-called MM-AGVs, which is to say, Multi-Purpose-Micro Automated Guide Vehicles, which are characterized by their compact size. The size is preferably adapted to the free space of a euro-pallet in accordance with EN 13698-1, so that the AGV can enter this free space. The free space between the three bottom boards is 227.5 mm wide and 100 mm high, wherein the vehicle 3 should not exceed these dimensions in order to be able to drive into the free space.

In the simplest case, the logistics region 10 can be an accessible and horizontally oriented logistics plane, such as, for example, a floor of a warehouse, and can include a loading station for trucks 5—as shown in FIG. 1 and FIG. 2. The vehicles 3 can moreover also drive onto a truck 5 or its loading area in the logistics region 10 to load or unload the consignment of goods 6. It should be noted at this point that the logistics region 10 can also be accessed via several floors or the like, wherein, for example, the floors or planes can be connected via ramps.

The battery-operated and driverless vehicles 3 comprise a drive device 32, a lifting device 34 and a battery, not shown, which can supply the vehicle with electrical power. According to a preferred embodiment, the battery is a rechargeable battery, wherein the battery can either be permanently arranged on the vehicle 3 or can be exchanged via a quick-change system.

According to a preferred embodiment which is shown in FIG. 3, the lifting device 34 can be arranged on an upper side of the vehicle 3 and can be configured to raise or lower the consignment of goods 6. The lifting device 34 can be movable and can further preferably raise or lower the consignment of goods independently of the direction of travel of the vehicle 3. The vehicle 3 can moreover be configured to balance out the consignment of goods.

The coordination or alternatively control of the vehicle 3 or alternatively the vehicles 3 of the transport system 1 can take place via an electronic coupling, in particular by means of wireless communication. Sensors 36 are used to control the vehicle 3 and can prevent collisions.

The vehicle can determine the weight of the consignment of goods and, for example, transmit it to a control system.

The vehicle 3 can moreover comprise an interface, not shown, by means of which the vehicle 3 can be powered to charge the battery. The interface can be wired or wireless, wherein the interface can preferably be configured as a wired interface on the underside opposite the top side.

With reference to FIG. 1, it can be seen that the transport system 1 comprises a plurality of vehicles 3, which can swarm out from a supply device 2 and can be operated in a swarm, for example, to carry out extensive and time-consuming tasks automatically.

In order to perform a task, for example, the transportation of consignments of goods 6 from a first location to a second location, the vehicle 3 can take on a formation as shown in FIG. 1 and preferably move synchronously within this formation. The formation consists of at least two, preferably four, even more preferably six, or even more preferably more than six vehicles 3. In the formation, the vehicles 3 are arranged, for example, in a line or a cuboid, preferably in rows and columns, which is to say, in an orderly manner. In the case of an uneven load, the formation can also be adjusted.

As will be described in detail later, the vehicles 3 can swarm out from the supply device 2 to a first location in any desired manner and can take up the formation at the consignment of goods 6 or under the consignment of goods 6 and couple the consignment of goods 6. Coupling can take place by means of the lifting device 34.

Transportation from a first location to a second location takes place in the formation. At the second location, the vehicles 3 can deposit the consignment of goods 6. After depositing the consignment of goods 6, the vehicles 3 can leave the formation and either take on further task's or travel back to the supply device 2.

FIG. 2 shows the so-called "one shot" loading or unloading of a truck 5. In the case of "one shot" loading or unloading, several transport goods 6 are transported by a large number of vehicles 3 in a formation in a preferably synchronized or coordinated movement. For "one shot" loading, the consignment of goods 6 can be, for example, supplied in a formation of 3×4 euro-pallets in the logistics region 12. In this example, four vehicles 3 are used per euro-pallet to transport the consignment of goods, which is why 48 vehicles are supplied for "one shot" loading.

The supply device 2 is located within the logistics region 10 and is arranged in a storage region 12, which is substantially arranged in a vertically oriented plane, and is configured to receive a plurality of vehicles 3 in the manner of a vertical storage system from the logistics region 10 by means of an entrance area 14 or to supply them via an exit area 16.

The supply device 2 comprises a plurality of receptacles 20, wherein the respective receptacle 20 can accommodate at least one vehicle 3. The receptacles 20 are guided by a guide device 24 along a preferably closed travel path. The travel path can exhibit any shape. By way of example, to increase the capacity of the supply device 2, the travel path can be configured in a meandering shape, as shown in FIG. 7.

The guide device 24 can be configured as a modular system. Thanks to the modular system, a supply device 2 can be easily adapted to requirements and subsequent retrofitting or expansion can be easily realized.

The guide device 24 comprises means of traction or conveyance that enable synchronous movement of all receptacles 20 along the guide device 24.

The means of traction or conveyance comprise a drive, not shown, by means of which the receptacles 20 can be moved along the travel path-preferably in a single direction of movement 28, see FIG. 4. The direction of movement 28 can, however, also be changed, for example, to supply at least one vehicle 3 more quickly or to be able to receive it again.

The receptacles 20 can be coupled to each other in a chain-like manner and even more preferably at constant intervals and thus be guided repeatedly and in sequence—in the manner of a chain magazine-into the entrance area 14 and/or into the exit area 16, preferably in a timed manner. The drive can temporarily slow down or stop this movement to make it easier to receive or supply the at least one vehicle 3.

The receptacles 20 are kept horizontally oriented along the entire travel path. In this manner, their spatial position along the entire travel path remains substantially unchanged. The receptacles 20 can be configured in the manner of gondolas for this purpose or the orientation can be specified by the guide device 24. A guide device 24 obtained in this manner for a plurality of receptacles is known, for example, from so-called paternoster elevators.

The respective receptacle 20 can comprise at least one parking position 22 on which a vehicle 3 can be arranged or alternatively parked. In the entry area 14, the at least one vehicle 3 from the logistics region 10 can be received by the receptacle 20 or alternatively can travel into the parking position 22 of the receptacle 20. In the exit area 16, the at least one vehicle 3 can be supplied by the receptacle 20 or can travel from the parking position 22 of the receptacle 20 and travel into the logistics region 10.

The receptacle 20 comprises means, not shown, for charging the battery. The means for charging the battery of the at least one vehicle 3 received by the receptacle 20 can charge the battery of the at least one vehicle 3 by wire or wirelessly as soon as the vehicle 3 has been received by the receptacle 20. The receptacle 20 may moreover comprise means, not shown, for cleaning or servicing the vehicle 3. The means for cleaning or servicing the vehicle 3 may, for example, use compressed air, disinfectant and/or water.

The means for charging the battery and/or the means for cleaning or servicing may be provided at each parking position 22. The means may comprise electrical contacts, not shown, which can interact with corresponding contacts on the vehicle 3 in a known manner and establish an electrical connection between the parking position 22 and the vehicle 3 for electrically charging the battery of the vehicle 3.

The receptacle 20 can, moreover, have retaining means, not shown, by means of which the at least one vehicle 3 is held on the receptacle 20. Preferably, the at least one vehicle 3 is mechanically or magnetically held on the receptacle 20. The retaining means can prevent the vehicle 3 from slipping relative to the receptacle 20 or on the parking position 22 in the event of a jerky movement of the receptacle 20 along the guide device 24, for example, due to acceleration or slowing down of the receptacle 20 along the travel path.

A further development according to FIG. 6 shows further parking positions 22', which are arranged along the guide device 24 in the storage region 12. The parking positions 22' are arranged like shelves and are stationary in relation to the receptacles 20 and at least one vehicle 3 can be transferred from a receptacle 20—as indicated by a double arrow—to the parking position 22' or travel onto the parking position 22'. The parking positions 22' may comprise means for charging the battery or to enable a targeted ejection of specific vehicles 3 for maintenance, repair, preventive maintenance and/or repair work. In the at least one parking position 22', vehicles 3 can be supplied as replacements in order to be able to supply sufficient vehicles 3 in the event of vehicle 3 failures or increased demand.

For the supply or receiving of at least one vehicle 3, the receptacle can be arranged in the logistics region 10 or in alignment with the logistics plane 10, and the at least one vehicle 3 can—as shown in FIG. 4—travel onto the receptacle 20 or travel off of the receptacle 20.

The driverless transportation system 1 for the plurality of battery-operated and driverless vehicles 3 can be operated as described below. As soon as there is a need for vehicles 3 to carry out tasks in the logistics region 10, the supply device 2 supplies the vehicles 3 that have batteries in a charged state. For this purpose, the receptacles 20 are moved in sequence along the guide device 24 and moved one after the other or alternatively in a timed manner into the entry and/or exit area 14, 16 and supplied from there. The vehicles 3 can swarm out from the entry and/or exit area 14, 16, to the first location in the logistics region to carry out tasks and couple to the consignment of goods 6. This is followed by transportation to a second location, where the consignment of goods 6 is dropped. Further tasks can be carried out.

After all tasks have been completed or as soon as the charge level of a battery of a vehicle 3 falls below a certain level, the respective vehicle 3 travels back to the supply device 2 and is received by a free receptacle 20.

The charging of the battery of the vehicle 3 then takes place, wherein the vehicle 3 remains on the receptacle 20 or in the parking position 22 until the battery is sufficiently charged and further tasks are to be carried out.

LIST OF REFERENCE SIGNS

1 Transport system
2 Supply device
3 Vehicle
5 Truck
6 Consignment of goods
10 Logistics plane
12 Plane
14 Entrance area
16 Exit area
20 Receptacle
22 Parking space
32 Moving equipment
34 Lifting device
36 Sensors

The invention claimed is:

1. A method for operating a driverless transport system (1) with a plurality of battery-operated and driverless vehicles (3) for transporting a consignment of goods (6) over a drivable logistics region (10) having a supply device (2), the supply device (2) having at least one receptacle (20) which receives at least one vehicle (3) and is movable in at least one vertically oriented plane in a storage region (12), comprising:

supplying at least one of the vehicles (3) by means of the at least one receptacle (20) in the logistics region (10);

positioning the at least one of the vehicles (3) at the consignment of goods (6);

coupling the consignment of goods (6) to the at least one of the vehicles (3) and transporting the consignment of goods by the at least one vehicle (3) from a first location to a second location;

depositing the consignment of goods (6);

the at least one receptacle (20) comprising a plurality of receptacles, the method further comprising respectively receiving the plurality of vehicles (3) by the plurality of receptacles (20) of the supply device (2), the plurality of vehicles (3) being respectively vertically stacked and stored in the plurality of receptacles, wherein each of the receptacles (20) comprises means for changing or charging a battery of each of the vehicles (3), the method further comprising changing or charging the battery of the at least one of the vehicles; and moving the plurality of receptacles (20) with the plurality of vehicles (3).

2. The method according to claim 1, wherein the changing or charging of the battery of the at least one vehicle (3) takes place in the storage region (12).

3. The method according to claim 1, wherein the at least one vehicle (3) travels back to the supply device (2) and is received by it when the vehicle (3) falls below a charge level.

4. The method according to claim 1, wherein the at least one receptacle (20) can be moved along a guide device (24).

5. The method according to claim 4, wherein the guide device (24) guides the at least one receptacle (20) along a closed travel path.

6. The method according to claim 4, wherein the movement of the at least one receptacle (20) occurs along the guide device (24) in a single direction of movement (26).

7. The method according to claim 4, wherein the at least one receptacle (20) is moved along the guide device (24) in such a way that an orientation of the at least one receptacle (20) in the horizontal remains substantially unchanged.

8. The method according to claim 1, wherein the at least one receptacle (20) is temporarily slowed down or stopped for the supply of the at least one vehicle (3).

9. The method according to claim 1, wherein the at least one vehicle (3) is positioned under the consignment of goods (6) to be transported for coupling.

10. The method according to claim 1, wherein, to couple the consignment of goods (6) to the at least one vehicle (3), the consignment of goods (6) is lifted by the at least one vehicle (3).

11. The method according to claim 1, wherein a plurality of the vehicles (3) for transporting the consignment of goods (6) are arranged in a formation.

12. The method according to claim 1, wherein the storage region (12) comprises at least one parking position (22) on which the at least one vehicle (3) can be arranged.

13. The method according to claim 1, wherein the at least one vehicle (3) can be held on the receptacle (20) by retaining means.

14. A supply device (2) for a plurality of battery-operated and driverless vehicles (3), wherein the vehicles (3) can be dispensed and received in at least one drivable logistics region (10) through an entry and/or exit area (14, 16), wherein the supply device (2) comprises at least one receptacle (20) that receives at least one of the vehicles (3), the at least one receptacle (20) comprising means for changing or charging the battery of the at least one vehicle (3), wherein the at least one receptacle (20) is movable in at least one vertically oriented plane in a storage region (12), wherein the at least one receptacle (20) can dispense the at least one vehicle (3) in the entry and/or exit area (14, 16) in the at least one drivable logistics region (10) and can receive the at least one vehicle (3) from the at least one drivable logistics region (10), wherein the at least one receptacle (20) comprises a plurality of receptacles (20) for respective vertical stacked storage of the plurality of vehicles (3).

15. The supply device (2) according to claim 14, wherein the means for changing or charging the battery are conductive or inductive.

16. The supply device (2) according to claim 14, wherein a guide device (24) is provided and that the guide device (24) guides the at least one receptacle (20) along a predetermined travel path.

17. The supply device (2) according claim 16, wherein the guide device (24) represents a closed travel path.

18. The supply device (2) according to claim 16, wherein the guide device (24) guides the at least one receptacle (20) along the travel path in a horizontal orientation.

19. The supply device (2) according to claim 14, wherein the at least one receptacle (20) comprises retaining means by which the at least one vehicle (3) can be fastened to the receptacle (20).

20. The supply device (2) according to claim 14, wherein the storage region (12) comprises a plurality of parking positions (22), and in that at least one vehicle (3) can be arranged on the respective parking position (22).

21. A transport system (1) comprising the supply device (2) according to claim 14.

* * * * *